Aug. 5, 1952            P. MOLLER            2,605,859
PROTECTIVE APPARATUS FOR BEARINGS
Original Filed Aug. 1, 1947            2 SHEETS—SHEET 2
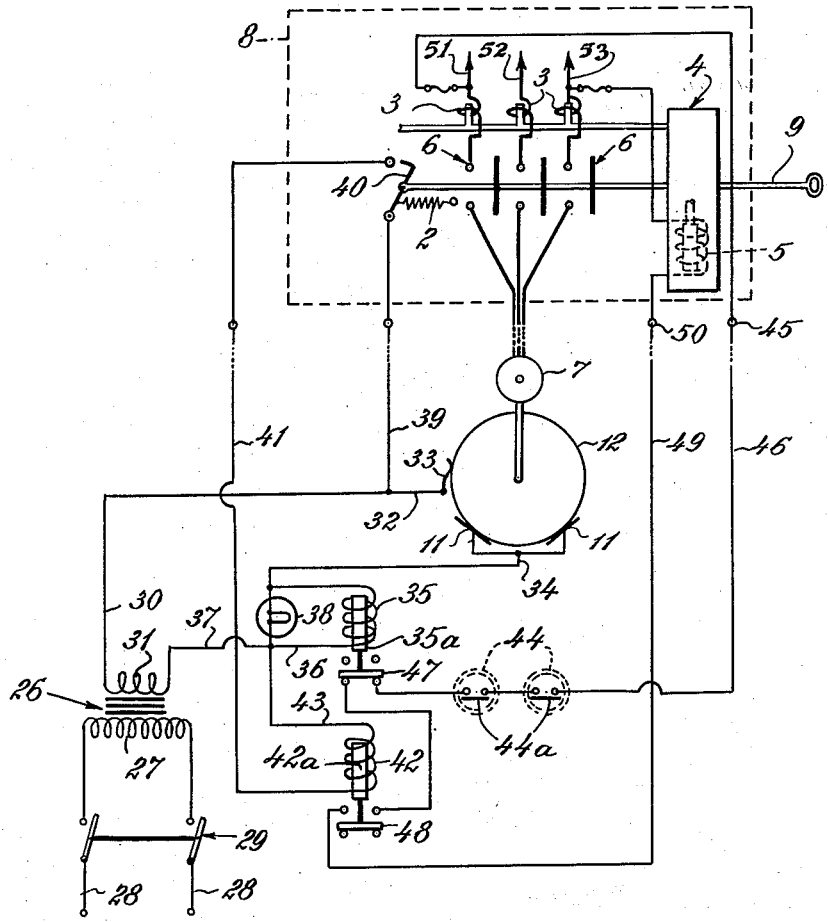
INVENTOR
Poul Moller
BY
Pennie, Edmonds, Morton and Barrows
ATTORNEYS Patented Aug. 5, 1952

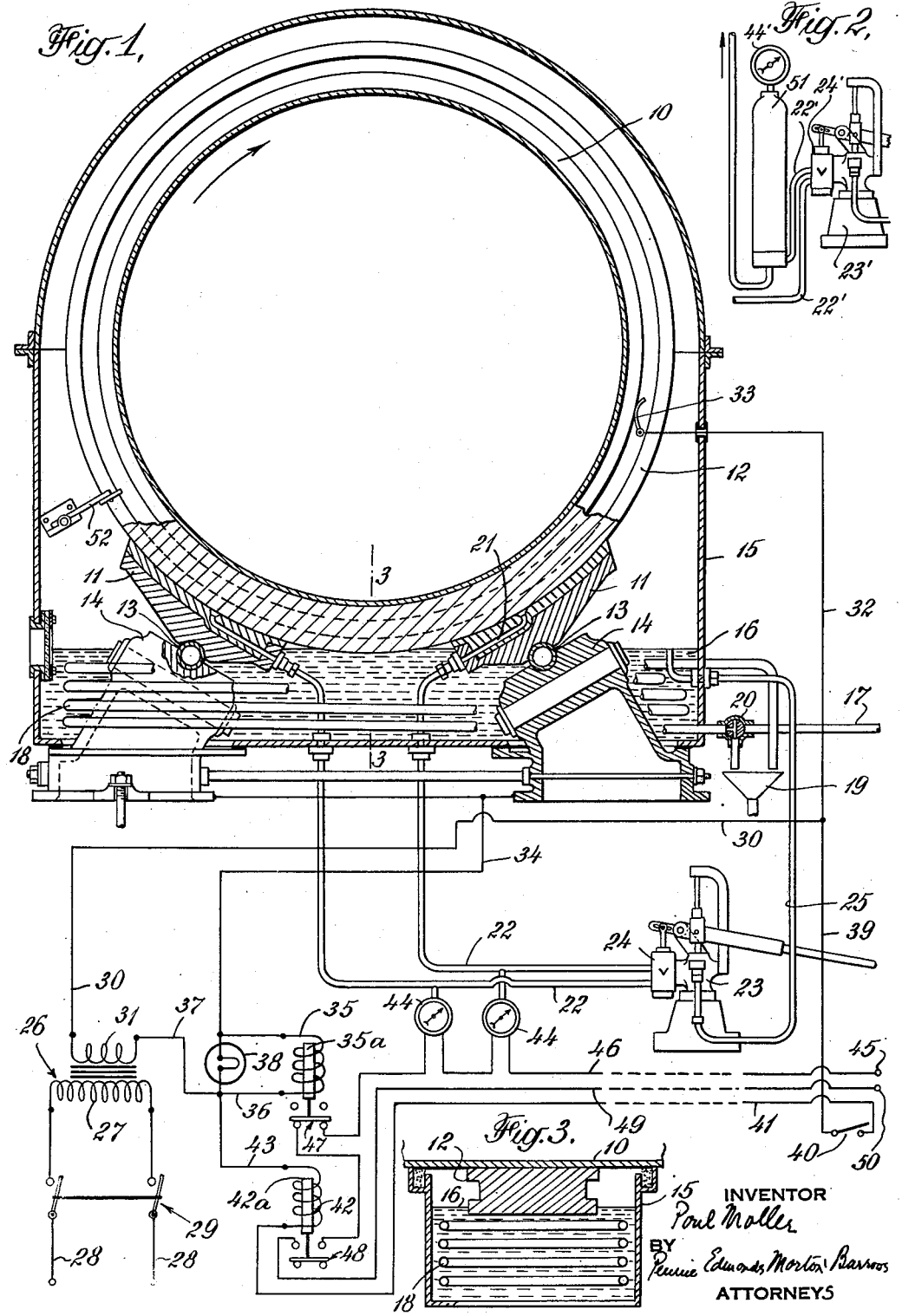

2,605,859

UNITED STATES PATENT OFFICE 2,605,859

PROTECTIVE APPARATUS FOR BEARINGS

Poul Moller, Copenhagen, Denmark, assignor to F. L. Smidth & Co., New York, N. Y., a corporation of New Jersey Original application August 1, 1947, Serial No. 765,508. Divided and this application June 9, 1949, Serial No. 98,150. In Denmark October 28, 1943

Section 1, Public Law 690, August 8, 1946
Patent expires October 28, 1963

3 Claims. (Cl. 184—6)

This invention relates to the lubrication of the bearing surfaces of rotary structures, which are supported for rotation by means of bearing elements, sliding one upon another. More particularly, the invention is concerned with a protective apparatus for the bearing elements including means for preventing rotation of the structures and relative movement of the bearing elements one upon another, so long as the relatively sliding elements are in metallic contact and there is no lubricant between them.

The subject matter of this application is disclosed in my copending application Ser. No. 765,508, filed on August 1, 1947, of which this application is a division.

Installations, of the type disclosed in my aforementioned copending application Serial No. 765,508, which include heavy rotary structures sliding on bearing surfaces, such as grinding mills, drying drums and rotary kilns, require the presence of a film of oil between the contacting bearing surfaces throughout operation, and certain forms of bearings are so constructed that a film of oil is maintained between them, so long as the structure is in rotation. However, when such an apparatus stops, the oil is forced out of the bearings and it is necessary that the oil film be restored before rotation of the structure is started again. The loss of the oil film between the bearing surfaces of such an installation is most likely to occur in those forms of apparatus, in which there is a long period of idleness between working periods, and, while the operators of such equipment are instructed not to start them in operation, until oil has been forced between the bearing surfaces, there is always a risk that the operator will forget to pump the oil to the surfaces or that the oil will not reach the surfaces because of a defect in the pumping apparatus.

The present invention is directed to the provision in such an installation, including a heavy rotating structure, and in any mechanism in which bearing elements slide one upon another, of means for preventing operation thereof so long as the bearing surfaces are in metallic contact with no oil between them. Ordinarily, such a rotary structure is driven by an electric motor and, in that event, starting of the motor until it is certain that there is an oil film between the bearing surfaces may be prevented in various ways. Thus, a low voltage protection circuit, commonly called a "no voltage circuit" arranged to trip a circuit breaker for the motor, may include one or more contact devices, which are closed only when the bearing surfaces for the structure are separated by an oil film, or when oil has been supplied to the surfaces until a pressure exceeding a selected value has been built up. Preferably, the no-voltage circuit includes contact devices of both sorts, although either may be used alone.

For a better understanding of the invention, reference may be made to the accompanying drawing, in which Fig. 1 is a transverse sectional view through an installation including part of the circuit connections of the protective apparatus of the invention;

Fig. 2 is an elevational view of a modified part of the installation;

Fig. 3 is a sectional view on the line 3—3 of Fig. 1; and

Fig. 4 is a circuit diagram of the motor control circuits including the protection circuit and appurtenant apparatus.

The rotary structure 10, disclosed in my copending application Ser. No. 765,508 and shown here as being illustrative of an installation in which the apparatus of this invention may be used, is a rotary grinding mill, which is supported for rotation on pairs of slide shoes 11 engaging slide rings 12 encircling the drum. Each shoe rests upon a cylinder 13 mounted on a base member 14 with its axis parallel to the axis of the drum and the shoes are disposed on either side of the vertical axial plane through a drum with the lower ends of their working surfaces spaced above a horizontal plane tangent to their ring 12 at its lowest point. Each ring and its shoes and their bases are enclosed within a casing 15, encircling the drum, and the lower part of the casing is oil-tight and contains a body of oil 16. The level of the oil within the casing is maintained at such a height that the oil touches the bottom of ring 12 but does not reach the lower ends of the working surfaces of the shoes 11. The oil is preferably cooled during the operation of the apparatus and, for this purpose, a cooling fluid supplied through a line 17 is circulated through a coil 18 within the casing below the level of the oil and discharged into a collecting funnel 19. The line 17 is provided with a three-way valve 20, so that the fluid may be drained from the coil.

Each of the shoes is formed with a passage 21 opening at one end at the working face of the shoe and oil is supplied to the other end of the passage through a line 22 connected to a hand pump 23 through a distributing valve 24. A line 25 leads from the interior of casing 15 to the intake of the pump and the height of the intake end of line 25 within the casing is that at which the oil level in the casing should be maintained. The valve 24 is so constructed that the oil discharged from the pump is automatically directed alternately into the lines 22 leading to the respective shoes.

Referring to Figs. 1 and 4, the means for preventing starting of the drum, when there is no oil film between shoes 11 and ring 12, includes a transformer 26, the primary 27 of which can be supplied with current from a suitable current source 28 through a switch 29. Current source 28 may conveniently be derived from power source 51, 52, 53, although it may be independent thereof. A line 30 leading from one end of the secondary 31 of the transformer is connected by a branch line 32 to a contact member 33 bearing against the ring 12. A line 34 connected to the shoes, either directly or through their bases, leads to one end of a solenoid 35, the other end of which is connected by lines 36, 37 to the other end of a secondary 31. A signal lamp 38 is connected across solenoid 35. A branch line 39 leading from line 30 is connected to one terminal of an auxiliary switch 40 on the circuit breaker 8, the other terminal of which is connected by line 41 to one end of a solenoid 42. The other end of solenoid 42 is connected by a line 43 to line 37, and through that line to one end of secondary 31. The above mentioned auxiliary switch 40 is mounted at the circuit breaker 8 for actuation by the initial movement of the circuit breaker so as to close before the main circuit breaker contacts 6 can move to closed position. The circuit breaker is of the well-known safety type including the usual overload release coils 3 and a low-voltage or no-voltage release coil 5, as well as a lock-out mechanism 4 which prevents manual closure of main contacts 6 when coil 5 is deenergized.

Each of the oil lines 22 for supplying oil to the shoes has a branch leading to a pressure gauge 44 and, within each gauge are contacts 44a, which are closed, when the pressure of oil acting on the gauge exceeds a selected value. The contacts within the gauges are in series in the no-voltage circuit of the circuit breaker of the motor 7 which drives the drum, the circuit starting from terminal 45 and including line 46, the gauge switch contacts 44a, a normally closed solenoid switch 47 operable by the plunger 35a of solenoid 35, a normally open solenoid switch 48 operable by plunger 42a of solenoid 42, and line 49 leading to terminal 50.

In the modified construction shown in Fig. 2, a line 22' leads from the distributing valve 24' associated with pump 23' to each slide shoe, and, in each line 22', there is a tank 51, to which a pressure gauge 44' is connected. With this arrangement, excessive oscillation of the gauge in rhythm with the strokes of the pump 23' is prevented by the damping effect of tank 51. It is understood that gauge 44' includes contacts which are connected in the manner that contacts 44a are connected in Fig. 4.

When the operator desires to start rotation of drum 10, he first closes switch 29 and connected to the current source 28, current passes from the secondary 31 of the transformer 26 through lines 30 and 32 to contact 33 and ring 12. If the ring and either shoe 11 is in metallic contact, because of the absence of a lubricating film between the shoe and the ring, current flows from the ring to the shoe in metallic contact therewith and then through line 34 to solenoid 35. The current causes the solenoid to be energized, so that switch 47 in the no-voltage circuit of the circuit breaker 8 of the motor 7 is opened and the motor can not be started. Lamp 38 is also lighted, warning the operator that the shoe lubrication is deficient. The operator then operates pump 23 to pump oil to the shoes and, when the pressure of the oil supplied to both shoes exceeds the values for which the gauges are set, the gauge contacts 44a in the no-voltage circuit of the circuit breaker are automatically closed. The operator can tell when the desired pressure has been reached by reference to the gauge needles and, when there is a film of oil between both shoes and ring 12, the circuit through solenoid 35 is deenergized and switch 47 in the no-voltage circuit is closed. The no-voltage circuit is still open, however, because the circuit through solenoid 42 is not closed at switch 40, and switch 48 in the no-voltage circuit remains open, until solenoid 42 is energized. When the pumping of the oil has been completed, the operator, by moving handle 9, starts to close contacts 6 of the circuit breaker, through which current is supplied to the motor from power source 51, 52, 53 and, in the initial part of the closing operation, switch 40 is closed. This causes solenoid 42 to be energized closing switch 48, and the no-voltage circuit is then completed to the two outside legs 51, 53 of the power source. The closing of the circuit breaker is then completed and the motor starts to operate. In accordance with usual practice, it is assumed that a suitable starting resistance may be connected to the rotor of the motor, if desired.

The utmost protection against damage to the bearing surfaces of the installation is provided by utilizing the circuit established through the bearing surfaces, when they are not separated by the oil film, and employing contacts in the no-voltage circuit of the circuit breaker, which are controlled by the oil pressure gauges, but either of these expedients may be employed alone. The use of the circuit established by metallic contact between the bearing surfaces provides protection not only at the starting of a working period but also throughout operation, since the circuit breaker of the motor will be opened by spring 2 upon opening of its no-voltage circuit resulting, for example, from leakage of the oil from casing 15, or falling of the oil level within the casing, so that the oil does not touch the surface of ring 12.

If protection of the bearings is provided by employing only the circuit including the ring and slide shoes and not using contacts controlled by the pressure gauges, it is important that normally open solenoid switch 48 be employed, since without them, it would be possible for the operator to start the motor without closing switch 29. Until switch 29 is closed, the no-voltage circuit of the circuit breaker is normally closed through switch 47 but normally open at switch 48. Thus, if solenoid 42 and switch 48 were omitted and no gauge contacts 44a were employed, the no-voltage circuit would be established if the bearing surfaces were in metallic contact and switch 29 were not closed.

As pointed out above, the intake end of pipe 25 leading to the pump lies at the level at which the oil should be maintained within casing 15. If the oil falls below that level and the operator attempts to pump oil to the bearings, the pump can not take in any oil and no oil will be supplied to shoes 11. The operator will then realize that the body of oil within the casing needs replenishing. When the oil is at the proper level within the casing, the ring 12 continuously picks up oil which serves to maintain the films between the ring and shoes 11. Excessive oil may then be removed from the sides of the ring by spring-pressed scrapers 52 mounted at any convenient place within the casing.

I claim:

1. In an installation including a motor-driven rotary structure and means for supplying electric power to the motor, including a power source, a circuit breaker of the type having a no-voltage release coil and a protection circuit which must be closed before the circuit breaker can be closed to start the motor and which must also be closed to hold the circuit breaker closed, said circuit including said coil and being energized from said power source, the combination of a circumferential bearing on the structure, a stationary bearing engaging the circumferential bearing and supporting the structure, the bearings having surfaces sliding one upon the other during rotation of the structure, means for supplying oil under pressure to the bearing surfaces, and means for releasing the circuit breaker to disconnect the power source from the motor, including a normally closed solenoid switch connected in series in said protection circuit, means for opening said switch including a solenoid circuit closed through said bearing surfaces when they are in metallic contact with no oil between them, a current source for said solenoid circuit, a normally open solenoid switch connected in series in said protection circuit, the last-named solenoid switch being energizable by current from said current source to close the normally open switch, and means including switch means connected in series with the solenoid of said last-named switch and operable by the circuit breaker to close before the circuit breaker closes.

2. In an installation including a motor-driven rotary structure and means for supplying electric power to the motor, including a power source, a circuit breaker of the type having a no-voltage release coil and a protection circuit which must be closed before the circuit breaker can be closed to start the motor and which must also be closed to hold the circuit breaker closed, said circuit including said coil and being energized from said power source, the combination of a circumferential bearing on the structure, a stationary bearing engaging the circumferential bearing and supporting the structure, the bearings having surfaces sliding one upon the other during rotation of the structure, means for supplying oil under pressure to the bearing surfaces, and means for releasing the circuit breaker to disconnect the power source from the motor, including a normally closed solenoid switch connected in series in said protection circuit, means for opening said switch including a solenoid circuit closed through said bearing surfaces when they are in metallic contact with no oil between them, a current source for said solenoid circuit, a normally open solenoid switch connected in series in said protection circuit, the last-named solenoid switch being energizable by current from said current source to close the normally open switch, first switch means connected in series with the solenoid of said last-named solenoid switch and operable by the circuit breaker to close before the circuit breaker closes, and means including second switch means for simultaneously connecting said current source to said solenoid circuit and to the solenoid of said last-named solenoid switch, whereby said protection circuit is automatically open when said bearing surfaces are in metallic contact or when the solenoid of said last-named solenoid switch is disconnected from said current source.

3. In an installation including a motor-driven rotary structure and means for supplying electric power to the motor, including a power source, a circuit breaker of the type having a no-voltage release coil and a protection circuit which must be closed before the circuit breaker can be closed to start the motor and which must also be closed to hold the circuit breaker closed, said circuit including said coil and being energized from said power source, the combination of a circumferential bearing on the structure, a stationary bearing engaging the circumferential bearing and supporting the structure, the bearings having surfaces sliding one upon the other during rotation of the structure, means for supplying oil under pressure to the bearing surfaces, pressure-indicating means connected to the oil supply means, and means for releasing the circuit breaker to disconnect the power source from the motor, including a normally closed solenoid switch connected in series in said protection circuit, means for opening said solenoid switch including a solenoid circuit closed through said bearing surfaces when they are in contact with no oil between them, indicating means connected to said solenoid circuit to indicate when said circuit is energized and thus when said bearings are unlubricated, said pressure-indicating means including pressure-actuated switching means connected in series in said protection circuit and responsive to the oil pressure in said oil supply means to close only when the oil pressure to the bearings exceeds a selected value, a current source for said solenoid circuit, a normally open solenoid switch connected in series in said protection circuit, the last-named solenoid switch being energizable by current from said current source to close the normally open solenoid switch, first switch means connected in series with the solenoid of said last-named solenoid switch and operable by the circuit breaker to close before the circuit breaker closes, and means including second switch means for simultaneously connecting said current source to said solenoid circuit and to the solenoid of said last-named solenoid switch, whereby said protection circuit is automatically open when said bearing surfaces are in bearing contact or when the solenoid of said last-named solenoid switch is disconnected from said current source.

POUL MOLLER.

REFERENCES CITED

The following references are of record in the file of this patent:

UNITED STATES PATENTS

| Number | Name | Date |
|---|---|---|
| 2,143,533 | Archea | Jan. 10, 1939 |

FOREIGN PATENTS

| Number | Country | Date |
|---|---|---|
| 380,876 | Germany | Sept. 13, 1923 |
| 64,666 | Denmark | July 29, 1946 |